(12) United States Patent
Srinivasan et al.

(10) Patent No.: US 9,477,383 B2
(45) Date of Patent: *Oct. 25, 2016

(54) LATENCY REDUCTION IN COLLABORATIVE PRESENTATION SHARING ENVIRONMENT

(71) Applicant: Microsoft Technology Licensing, LLC, Redmond, WA (US)

(72) Inventors: Jayendran Srinivasan, Sammamish, WA (US); Bill Ridmann, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 366 days.

This patent is subject to a terminal disclaimer.

(21) Appl. No.: 13/975,818

(22) Filed: Aug. 26, 2013

(65) Prior Publication Data

US 2013/0339862 A1 Dec. 19, 2013

Related U.S. Application Data

(63) Continuation of application No. 12/727,423, filed on Mar. 19, 2010, now Pat. No. 8,521,816.

(51) Int. Cl.
*G06F 15/16* (2006.01)
*G06F 3/0484* (2013.01)
*G06F 17/30* (2006.01)

(52) U.S. Cl.
CPC ....... *G06F 3/0484* (2013.01); *G06F 17/30056* (2013.01)

(58) Field of Classification Search
CPC . G06F 17/24; G06F 17/30056; G06F 3/0484
USPC .............. 709/204, 203, 217, 231, 245, 219; 715/751, 752, 753, 230, 232, 732, 730
See application file for complete search history.

(56) References Cited

U.S. PATENT DOCUMENTS 5,822,525 A 10/1998 Tafoya et al.
5,917,480 A 6/1999 Tafoya et al.
(Continued)

FOREIGN PATENT DOCUMENTS

WO 95/01024 A1 1/1995

OTHER PUBLICATIONS

Malcher et al., "A Context-aware Collaborative Presentation System for Handhelds," Oct. 29, 2008, http://www-di-inf.puc-rio.br/~endler//paperlinks/IPH-SBSC-2008.pdf, 11 pages.
(Continued)

*Primary Examiner* — Frantz Jean
(74) *Attorney, Agent, or Firm* — Monica Adjemian; Tom Wong; Micky Minhas (57) ABSTRACT

A method and system for delivering a presentation created using a presentation application program are disclosed. One method includes initiating, from a presentation computing system, display of a presentation to one or more remote computing devices. The method also includes creating an initial display package based on the presentation that includes metadata describing the presentation and an image representative of the presentation, and uploading the initial display package to a presentation server. The method includes, after uploading the initial display package, creating an initial set of presentation slides from the presentation, and uploading the initial set of presentation slides to the presentation server. The method further includes, after uploading the initial set of presentation slides, uploading at least a remaining portion of the presentation to the presentation server for display at one or more of the remote computing devices.

20 Claims, 7 Drawing Sheets (56) References Cited

U.S. PATENT DOCUMENTS

| | | | |
|---|---|---|---|
| 6,343,313 B1 | 1/2002 | Salesky et al. | |
| 6,760,749 B1 | 7/2004 | Dunlap et al. | |
| 7,035,899 B2 | 4/2006 | Marchon et al. | |
| 7,577,714 B2 * | 8/2009 | Saunders | H04L 29/06 709/213 |
| 7,864,186 B2 * | 1/2011 | Robotham | G06F 3/14 345/581 |
| 7,933,956 B2 * | 4/2011 | Hon | G06F 17/30058 709/205 |
| 8,595,296 B2 * | 11/2013 | Berberian | H04M 3/42221 709/204 |
| 8,887,052 B1 * | 11/2014 | Young | G06F 3/048 709/205 |
| 2002/0112004 A1 * | 8/2002 | Reid | H04L 12/1822 709/205 |
| 2003/0110218 A1 | 6/2003 | Stanley | |
| 2003/0160814 A1 | 8/2003 | Brown | |
| 2004/0100554 A1 * | 5/2004 | Vanderwilt | H04N 7/147 348/14.08 |
| 2004/0266412 A1 * | 12/2004 | Maes | G06Q 10/10 455/414.4 |
| 2005/0091579 A1 | 4/2005 | Mewherter et al. | |
| 2006/0023969 A1 | 2/2006 | Lara et al. | |
| 2006/0235927 A1 * | 10/2006 | Bhakta | G09B 5/06 709/204 |
| 2007/0250506 A1 | 10/2007 | Stevens et al. | |
| 2011/0231518 A1 | 9/2011 | Srinivasan et al. | |
| 2012/0102111 A1 * | 4/2012 | Salesky | G06F 3/1415 709/204 |

OTHER PUBLICATIONS

U.S. Appl. No. 12/727,423, Office Action mailed Oct. 31, 2012, 9 pages.

U.S. Appl. No. 12/727,423, Amendment and Response filed Jan. 31, 2013, 11 pages.

U.S. Appl. No. 12/727,423, Notice of Allowance mailed Apr. 25, 2013, 7 pages.

* cited by examiner

FIG. 7

LATENCY REDUCTION IN COLLABORATIVE PRESENTATION SHARING ENVIRONMENT

CROSS-REFERENCE TO RELATED APPLICATIONS

This application is a continuation application of U.S. patent application Ser. No. 12/727,423, entitled "LATENCY REDUCTION IN COLLABORATIVE PRESENTATION SHARING ENVIRONMENT," filed on Mar. 19, 2010, now issued as U.S. Pat. No. 8,521,816 on Aug. 27, 2013, the entire disclosure of which is hereby incorporated herein by reference.

BACKGROUND

Many Web Conferencing solutions have a presentation sharing feature that allows a presenter to upload a presentation and have attendees automatically download and view the presentation in sync with the presenter. In such an arrangement, a presenter, using a computing device (e.g., a presentation host), can upload the presentation to a server (e.g., a presentation server) for access by other attendees using computing systems remote from the presenter. The presenter can direct viewing of the presentation by directing the presentation at their computing system.

When the presenter uploads the presentation to a server, the presentation is typically converted into a number of resources that can be used by client devices to view the presentation. One reason a number of resources are created is to accommodate different capabilities of the remote computing devices attempting to view/access the presentation. For example, although some remote computing devices may be able to access the presentation using a presentation application program that is the same as the one at the host computer, other remote computing devices used by attendees may lack application software capable of rendering the presentation. In such cases, alternative forms of the presentation can be provided to those computing systems. Those alternative forms of the presentation can typically be viewed within widely available software, such as a web browser.

To convert the presentation into a number of resources requires a substantial amount of time. For example, it can take up to or over a minute to create each of the presentation resources used to ensure compatibility across devices. Because the presentation typically is completely converted prior to being uploaded to the presentation server, there is a substantial lag time between when a presenter makes a presentation available for viewing and when the presentation is in fact available to be viewed by remote systems accessing the presentation server.

SUMMARY

In accordance with the following disclosure, the above and other problems are addressed by the following:

In a first aspect, a method for delivering a presentation created using a presentation application program is disclosed. The method includes initiating, from a presentation computing system, display of a presentation to one or more remote computing devices, the presentation including a plurality of slides. The method also includes creating an initial display package based on the presentation, the initial display package including metadata describing the presentation and an image representative of the presentation, and uploading the initial display package to a presentation server. The method includes, after uploading the initial display package, creating an initial set of presentation slides from the presentation; the initial set of presentation slides including a predetermined number of slides selected from the plurality of slides, and uploading the initial set of presentation slides to the presentation server. The method further includes, after uploading the initial set of presentation slides, uploading at least a remainder of the presentation to the presentation server for display at one or more of the remote computing devices.

In a second aspect, a system for generating displayable portions of a presentation for delivery to one or more remote computing devices is disclosed. The system includes a presentation host system that is configured to initiate display of a presentation to one or more remote computing devices, the presentation including a plurality of slides. The presentation host system is also configured to create an initial display package based on the presentation, the initial display package including metadata describing the presentation and an image representative of the presentation, and upload the initial display package to a presentation server. The presentation host system is further configured to, after uploading the initial display package, create an initial set of presentation slides from the presentation; the initial set of presentation slides including a predetermined number of slides selected from the plurality of slides, and upload the initial set of presentation slides to the presentation server. The presentation host system is configured to, after uploading the initial set of presentation slides, upload the presentation to the presentation server for display at the remote computing devices.

In a third aspect, a computerized system for generating displayable portions of a presentation for delivery to one or more remote computing devices is disclosed. The system includes a presentation host system and a presentation server. The presentation host system includes a memory operatively connected to a programmable circuit configured to execute program instructions, which when executed cause the presentation host system to: initiate display of a presentation to a plurality of remote computing devices, the presentation including a plurality of slides. The presentation host system is also configured to create an initial display package based on the presentation, the initial display package including metadata describing the presentation and an image representative of the presentation, and upload the initial display package to a presentation server. The presentation host system is also configured to, after uploading the initial display package, create an initial set of presentation slides from the presentation; the initial set of presentation slides including a predetermined number of slides selected from the plurality of slides, and upload the initial set of presentation slides to the presentation server. The presentation host system is configured to, after uploading the initial set of presentation slides, upload the presentation to the presentation server for display at the plurality of remote computing devices. The presentation host system is configured to determine whether the presentation is to be viewed using a web application at a remote computing device from among the plurality of remote computing devices, and upon determining that the presentation is to be viewed using a web application, create an initial markup language set of slides from the initial set of presentation slides and uploading the initial markup language set of slides to the presentation server. The presentation server includes a memory operatively connected to a programmable circuit configured to execute program instructions, When executed, the program instructions cause the presentation server to deliver the initial display package to each of the remote computing devices, deliver the initial set of presentation slides to a remote computing device that is using a presentation application program to access the presentation, and deliver the initial markup language set of slides to a remote computing device that is using a web application to access the presentation.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DETAILED DESCRIPTION

Various embodiments of the present disclosure will be described in detail with reference to the drawings, wherein like reference numerals represent like parts and assemblies throughout the several views. Reference to various embodiments does not limit the scope of the disclosure, which is limited only by the scope of the claims attached hereto. Additionally, any examples set forth in this specification are not intended to be limiting and merely set forth some of the many possible embodiments.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

As briefly described above, embodiments of the present invention are directed to latency reduction in sharing a presentation in a collaborative environment. Generally, the present disclosure provides methods and systems by which a number of different displayable resources can be created based on a presentation, with each of the displayable resources useable to display the presentation to remote devices having different computing capabilities. Through use of defined process order in preparing the resources and by separating the time of availability of each of the resources based on presumptions regarding the order of use of a presentation, the time between initiating a collaborative session at a presentation host for viewing a presentation and availability of that presentation at remote devices is reduced.

Figure 1:
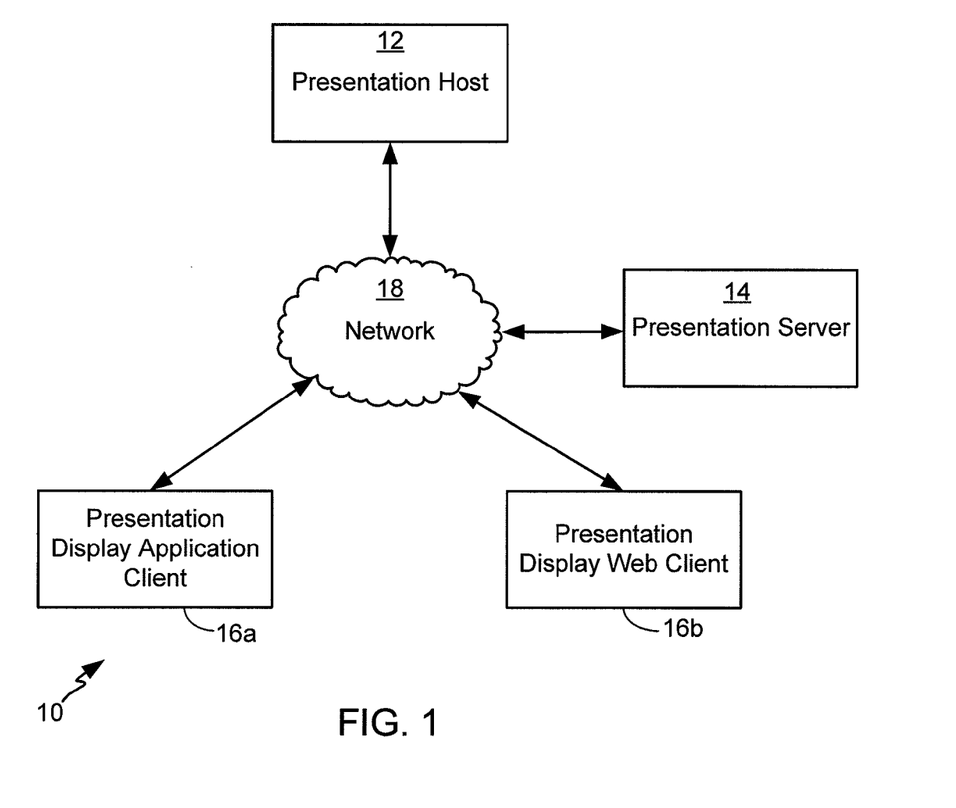
FIG. 1 illustrates a collaborative environment in which aspects of the present disclosure can be implemented.

FIG. 1 illustrates an example collaborative environment 10 in which aspects of the present disclosure can be implemented. The collaborative environment 10 provides an overall system in which a presentation can be shared and viewed at a number of different computing systems remote from each other (i.e., physically separate). The collaborative environment 10 includes a presentation host 12, a presentation server 14, and a plurality of remote computing systems (illustrated as remote systems 16a-b) interconnected by network 18. The network 18 can be any type of network capable of allowing communication of data between the various computing systems within the environment 10, such as a LAN, WAN, or Internet connection.

The presentation host 12 generally is a computing device or system from which a user will direct operation of a presentation via collaboration software. The presentation host 12 can either have the presentation stored in local memory, or can access the presentation from a remote system. In a possible embodiment, the presentation is created using the POWERPOINT® presentation graphics program from Microsoft Corporation of Redmond, Wash.

In possible embodiments, the presentation host 12 includes communication software capable of managing a "host" or active role in a collaborative presentation. An example of such communication and collaboration software is MICROSOFT® Communicator collaboration software from Microsoft Corporation of Redmond, Wash. By "host" it is intended that the presentation host 12 has the ability to make the presentation available to other users invited to view the presentation (e.g., via email invitation, online message, or otherwise) and to direct the view of the other attendees of the presentation. For example, the presentation host 12 can activate a presentation, causing other remote systems 16a-b to view the presentation, or can switch between slides of a POWERPOINT® presentation graphics program presentation, causing each of the remote systems 16a-b to view the slide selected at the presentation host. Other presentation direction capabilities can be provided as well.

The presentation server 14 receives a copy of the presentation from the presentation host 12, including both the presentation in its native format as well as a number of other resources useable to display the presentation to remote systems 16a-b, as described in further detail below in connection with FIGS. 3-4. The presentation server 14 maintains communication with the presentation host 12 to coordinate display of the presentation to remote systems 16a-b, such that when a particular slide or view is selected at the presentation host 12 by a user that same display will be presented to the remote systems 16a-b. The presentation server 14 can provide other functionality as well to enhance the presentation or collaboration experience, such as messaging (e.g. for question and answer or other types of communication), file transfer, control transfer (e.g., for transferring control over the presentation from the presentation host 12 to one of the remote devices 16a-b to allow it to become a new "host") or other features.

In possible embodiments, the presentation server 14 executes collaboration server software that allows it to provide centralized coordination of presentations or other communications. An example of such collaboration server software is MICROSOFT® Communication Server from Microsoft Corporation of Redmond, Wash.

The remote systems 16a-b generally correspond to computing systems operated by remote users wishing to view the presentation supplied by the presentation host 12. Each of the remote systems 16a-b may or may not have installed thereon one or more of the components used to view the presentation in its native or most-interactive format. For example, one or more remote systems may lack MICROSOFT® Communicator. In such cases, the remote system could be a thin client system or otherwise lacks application software (e.g. presentation or collaboration software), but might include some type of network connection and web browser application program, such as the INTERNET EXPLORER® browser program from Microsoft Corporation of Redmond, Washington.

In the embodiment shown, remote system 16a represents a remote system capable of loading and viewing a presentation using a collaboration software application program compatible with that provided at the presentation host (e.g., MICROSOFT® Communicator). Remote system 16b is illustrated as a remote system lacking the collaboration software, but configured with a web browser that can support a connection to the presentation server 14. In such instances, the presentation server 14 coordinates delivery of versions of a presentation to each of the remote systems 16a-b such that those systems receive versions of the software with which they are compatible. For example, remote system 16a could load a version of the presentation in its native format (e.g., PPT or PPTX format file) within the collaboration software, while remote system 16b could load a markup language version (e.g., DHTML format file) of the presentation within a web browser. Each of these different formats are included in the possible resources that can be loaded and displayed, as further explained below in connection with FIGS. 3-7.

Referring now to FIG. 1 generally, when a presentation host 12 initiates a presentation, it will create a number of resources for use by the remote systems 16a-b and upload those resources to the presentation server 14. The presentation host can, as further described below, separate and prioritize how those resources are created to ensure that the resources used soonest can be provided to the presentation server as soon as they are created. This prioritization at the presentation host 12 will allow the remote systems 16a-b to more quickly load the portions of the presentation likely to be used early in the presentation, while providing "background" processing of further resources to be used later in the presentation. This improves the perceived latency by users of both the presentation host 12 and the remote systems 16a-b, because only a portion of the presentation needs to be processed and made available by the presentation server 14 before the presentation can begin.

Figure 2:
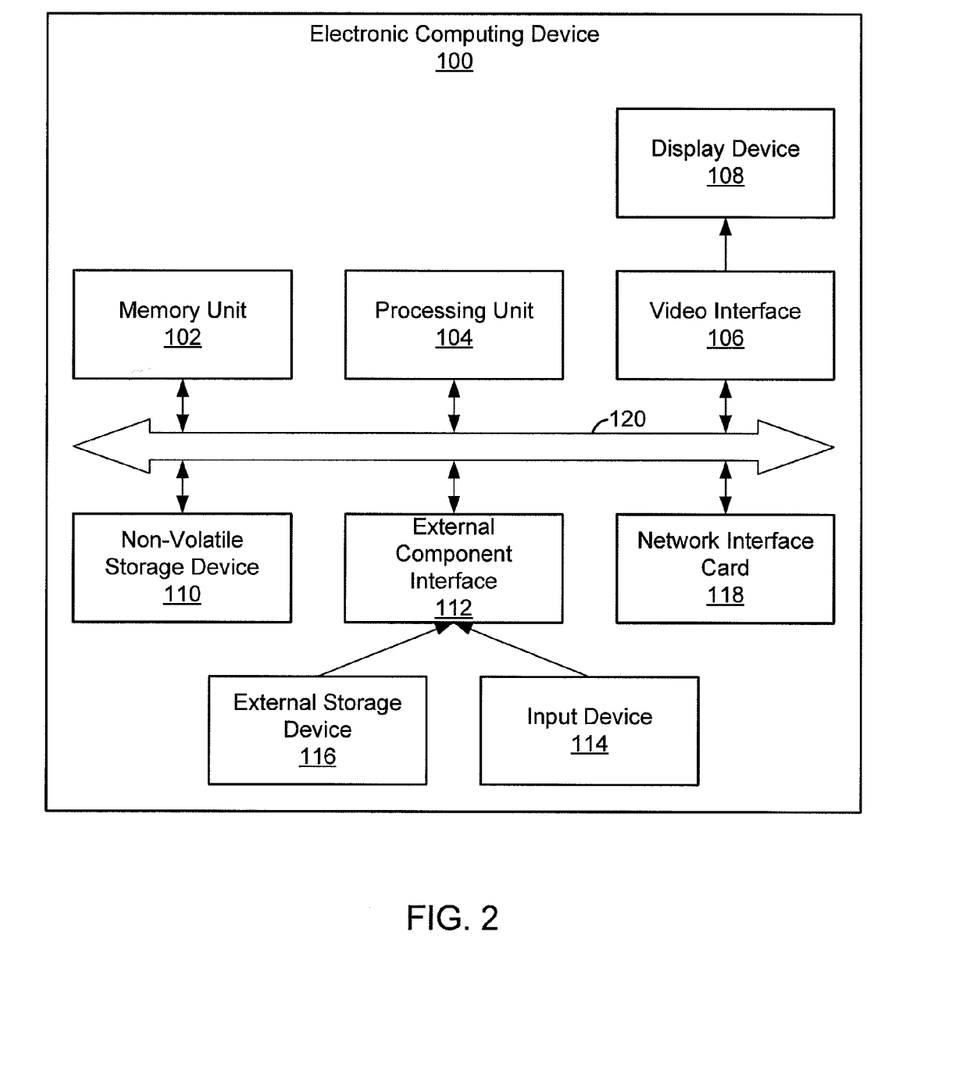
FIG. 2 illustrates an example electronic computing device capable of implementing aspects of the present disclosure.

FIG. 2 is a block diagram illustrating example physical components of an electronic computing device 100, which can be used as any of the computing systems described above in FIG. 1, such as the presentation host 12, presentation server 14, or remote systems 16a-b. A computing device, such as electronic computing device 100, typically includes at least some form of computer-readable media. Computer readable media can be any available media that can be accessed by the electronic computing device 100. By way of example, and not limitation, computer-readable media might comprise computer storage media and communication media.

As illustrated in the example of FIG. 2, electronic computing device 100 comprises a memory unit 102. Memory unit 102 is a computer storage medium capable of storing data and/or instructions. Memory unit 102 may be a variety of different types of computer storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer storage media.

In addition, electronic computing device 100 comprises a processing unit 104. As mentioned above, a processing unit is a set of one or more physical electronic integrated circuits that are capable of executing instructions. In a first example, processing unit 104 may execute software instructions that cause electronic computing device 100 to provide specific functionality. In this first example, processing unit 104 may be implemented as one or more processing cores and/or as one or more separate microprocessors. For instance, in this first example, processing unit 104 may be implemented as one or more Intel Core 2 microprocessors. Processing unit 104 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 104 may be implemented as an ASIC that provides specific functionality. In a third example, processing unit 104 may provide specific functionality by using an ASIC and by executing software instructions.

Electronic computing device 100 also comprises a video interface 106. Video interface 106 enables electronic computing device 100 to output video information to a display device 108. Display device 108 may be a variety of different types of display devices. For instance, display device 108 may be a cathode-ray tube display, an LCD display panel, a plasma screen display panel, a touch-sensitive display panel, a LED array, or another type of display device.

In addition, electronic computing device 100 includes a non-volatile storage device 110. Non-volatile storage device 110 is a computer storage medium that is capable of storing data and/or instructions. Non-volatile storage device 110 may be a variety of different types of non-volatile storage devices. For example, non-volatile storage device 110 may be one or more hard disk drives, magnetic tape drives, CD-ROM drives, DVD-ROM drives, Blu-Ray disc drives, or other types of non-volatile storage devices.

Electronic computing device 100 also includes an external component interface 112 that enables electronic computing device 100 to communicate with external components. As illustrated in the example of FIG. 2, external component interface 112 enables electronic computing device 100 to communicate with an input device 114 and an external storage device 116. In one implementation of electronic computing device 100, external component interface 112 is a Universal Serial Bus (USB) interface. In other implementations of electronic computing device 100, electronic computing device 100 may include another type of interface that enables electronic computing device 100 to communicate with input devices and/or output devices. For instance, electronic computing device 100 may include a PS/2 interface. Input device 114 may be a variety of different types of devices including, but not limited to, keyboards, mice, trackballs, stylus input devices, touch pads, touch-sensitive display screens, or other types of input devices. External storage device 116 may be a variety of different types of computer storage media including magnetic tape, flash memory modules, magnetic disk drives, optical disc drives, and other computer storage media.

In the context of the electronic computing device 100, computer storage media includes physical volatile and non-volatile, removable and non-removable media implemented in any method or technology for storage of information such as computer readable instructions, data structures, program modules or other data. Computer storage media includes, but is not limited to, various memory technologies listed above regarding memory unit 102, non-volatile storage device 110, or external storage device 116, as well as other RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the electronic computing device 100.

In addition, electronic computing device 100 includes a network interface card 118 that enables electronic computing device 100 to send data to and receive data from an electronic communication network. Network interface card 118 may be a variety of different types of network interface. For example, network interface card 118 may be an Ethernet interface, a token-ring network interface, a fiber optic network interface, a wireless network interface (e.g., WiFi, WiMax, etc.), or another type of network interface.

Electronic computing device 100 also includes a communications medium 120. Communications medium 120 facilitates communication among the various components of electronic computing device 100. Communications medium 120 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

Communication media, such as communications medium 120, typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Electronic computing device 100 includes several computer storage media (i.e., memory unit 102, non-volatile storage device 110, and external storage device 116). Together, these computer storage media may constitute a single data storage system. As discussed above, a data storage system is a set of one or more computer storage mediums. This data storage system may store instructions executable by processing unit 104. Activities described in the above description may result from the execution of the instructions stored on this data storage system. Thus, when this description says that a particular logical module performs a particular activity, such a statement may be interpreted to mean that instructions of the logical module, when executed by processing unit 104, cause electronic computing device 100 to perform the activity. In other words, when this description says that a particular logical module performs a particular activity, a reader may interpret such a statement to mean that the instructions configure electronic computing device 100 such that electronic computing device 100 performs the particular activity.

One of ordinary skill in the art will recognize that additional components, peripheral devices, communications interconnections and similar additional functionality may also be included within the electronic computing device 100 without departing from the spirit and scope of the present disclosure.

Figure 3:
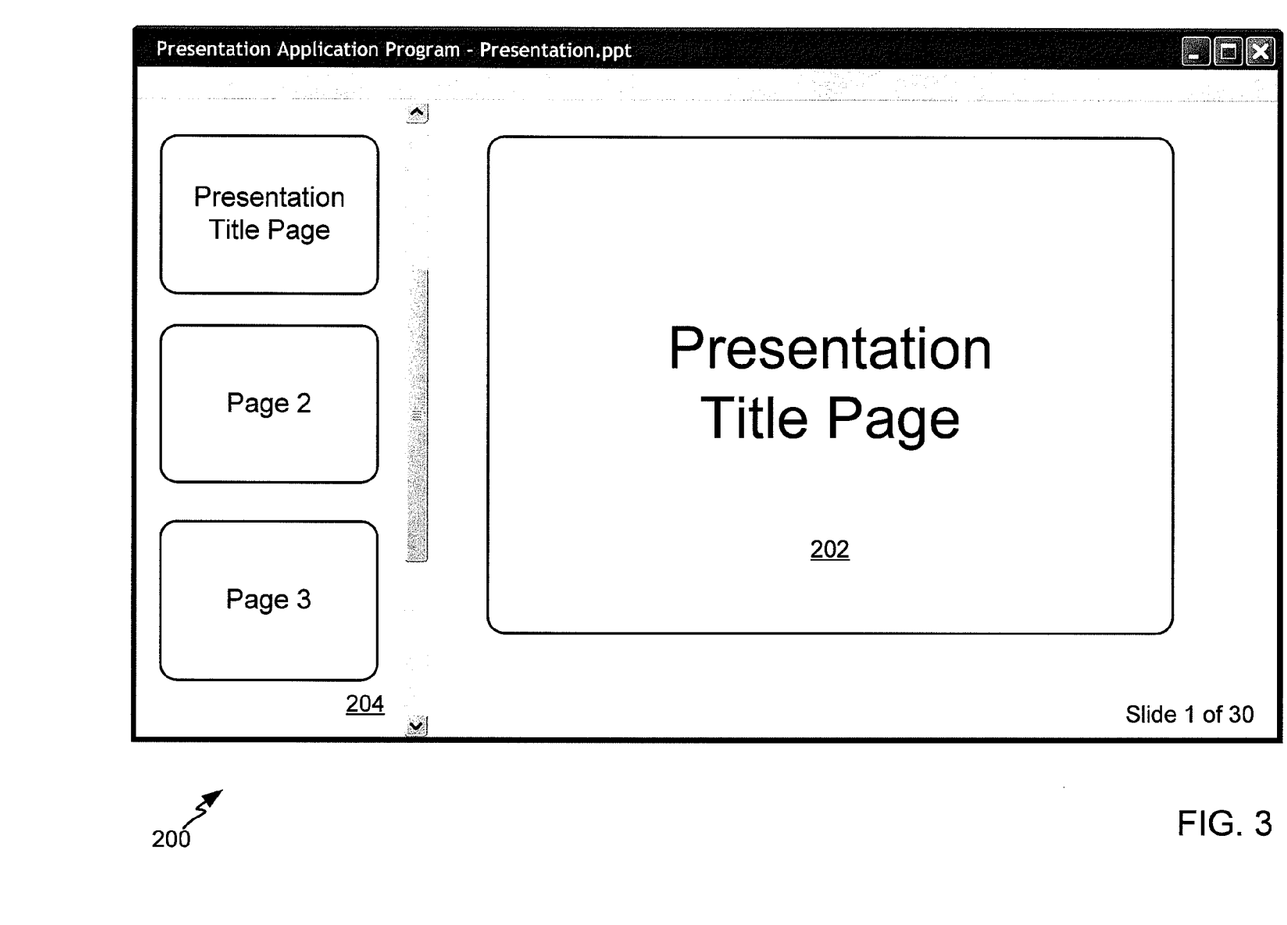
FIG. 3 is a schematic example version of a presentation display provided to a remote computing device, according to a possible embodiment of the present disclosure.

FIG. 3 is a schematic example version of a presentation display 200 provided to a remote computing device, according to a possible embodiment of the present disclosure. The presentation display 200 is a basic schematic of a presentation as it may appear in a collaboration environment and as displayed as created using a presentation application program such as the POWERPOINT® presentation graphics program by Microsoft Corporation. The presentation display 200 can represent, for example, a display within a collaboration application program of a presentation host (e.g. presentation host 12 of FIG. 1), or a collaboration application program or web browser of a remote system (e.g., remote systems 16a-b of FIG. 1).

When first displayed, a presentation display 200 will illustrate certain characteristics of the presentation to a user of a presentation host and remote users (e.g., the presentation host 12 and the remote users 16a-b). This information can include, for example, the name of the presentation, the number of slides included in the presentation, file size or filename, and other information. The presentation display 200 also includes a representative slide 202 and a slide listing 204. The representative slide 202 is typically a title slide or other selected slide or graphic capable of visually identifying the presentation to be given. The slide listing 204 is typically a collection of smaller images of the slides, or preview slides, of which typically only a first predetermined number are shown. In the embodiment shown, the first three preview slides are illustrated in the slide listing; however, in other embodiments, a greater or smaller number of slides could be visible in the slide listing 204.

In use, the presentation display 200 can generally be displayed in a similar manner both within collaboration software and within a web browser (e.g., via use of a web client) on one or more remote devices. Whether the collaboration software or web client is used depends on the particular software installed on the remote system; in certain embodiments, if collaboration software is present on the remote system, that software will be the default mechanism by which the presentation is displayed.

The presentation display 200 is also generally displayed within the collaboration software at a presentation host, such as presentation host 12 of FIG. 1. At the presentation host 12, the presentation display 200 is manipulable, e.g., by changing slides, scrolling through the slide listing 204, or otherwise navigating through or editing the presentation. Such changes to the presentation display 200 are communicated to the presentation server 14, which in turn communicates those changes to the remote devices on the versions of the presentation display (e.g., the native version or markup language version) presented to each remote device.

As can be seen in the presentation display 200, the initial display of the presentation uses initial display information including metadata describing the presentation and a representative image (e.g., as could be used as a preview image for the presentation), as well as a set of thumbnail images for a first set of the slides of the presentation (i.e., to be used in slide listing 204). Thumbnail images for the later slides in slide listing 204, as well as later slides in native form or markup language form are not initially displayed to a user, and therefore availability of those resources could be delayed.

Additional graphical and informational elements could be displayed on the presentation display 200 as well. Such elements could be included in the initial presentation information, the representative slide 202, the slide listing 204, or could relate to other elements of the presentation. The presentation display 200 is therefore intended as only exemplary.

Although in the present disclosure an example of the presentation display 200 is described as representing the POWERPOINT® presentation graphics program by Microsoft Corporation, other presentation application programs could be used as well, in a manner consistent with the present disclosure.

Figure 4:
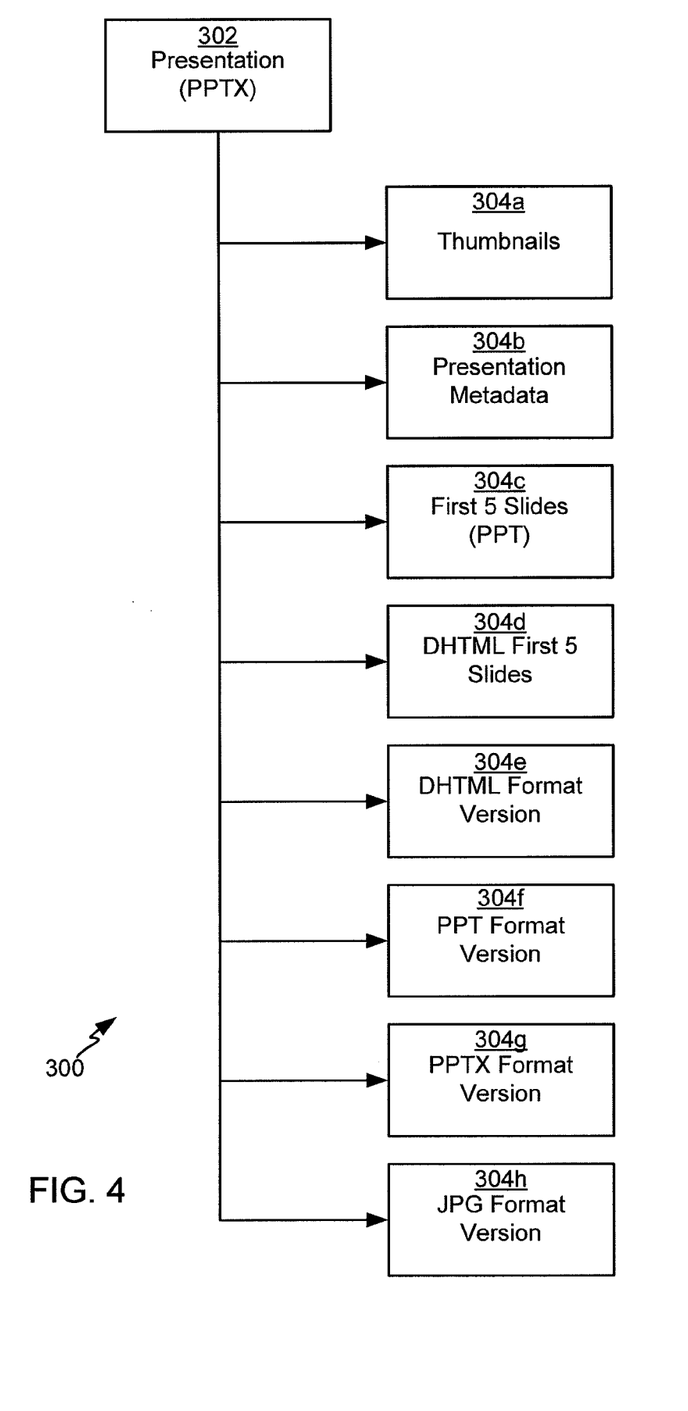
FIG. 4 is a logical diagram illustrating creation of resources useable by remote computing devices for display of a presentation, according to a possible embodiment of the present disclosure.

Referring now to FIG. 4, a logical diagram 300 is shown that illustrates creation of resources useable by remote computing devices for display of a presentation, according to a possible embodiment of the present disclosure. The logical diagram 300 provides an example set of resources that can be created from a presentation 302, which in the embodiment shown is a PPTX-format file created using the POWERPOINT® presentation graphics program by Microsoft Corporation. Other format files (e.g., PPT) could be used as well.

In the embodiment shown, a plurality of resources 304a-g are generated at a presentation host system (e.g., presentation host 12 of FIG. 1) for access by remote systems viewing the presentation 302. The plurality of resources includes thumbnails 304a, presentation metadata 304b, a slides subset 304c, a metadata slides subset 304d, a metadata version of the presentation 304e, a collaboration-compatible version of the presentation 304f, a native version of the presentation 304g, and an image version of the presentation 304h. Example contents and usage of each of these resources are described below.

The thumbnails 304a generally correspond to small, low resolution images of each of the slides, and can be used in a slide listing that is initially displayed when a presentation is displayed in a presentation application or web client version of the presentation display. For example, the thumbnails can be loaded and displayed in a slide listing 204 as illustrated in FIG. 3, above.

The presentation metadata 304b includes data that describes the presentation and can be used to set up a framework for loading or using the other resources associated with the presentation. For example, the presentation metadata 304b can include the name of the presentation, a number of slides used in the presentation, the name or number of the initial slide for display, notes regarding the slides, and other information. The presentation metadata 304b can be stored at the presentation server and used to render a presentation display in either a collaboration application program or a web client, with the specific content used varying based on the type of client device accessing the presentation. For example, a web client might use the presentation metadata 304b alongside a metadata version of the presentation (e.g., metadata version 304d, below), while an application client (i.e., a client running a collaboration application program might use presentation metadata 304b alongside a native version of the presentation. Furthermore, a client incapable of loading the particular web client version of the presentation could use the presentation metadata alongside an image version of the presentation, loaded as images natively within a web browser window.

The slides subset 304c includes a first predetermined number of slides in a format natively recognizable by a presentation application program and useable within collaboration software (e.g., PPTX or PPT format). The number of slides included in the slides subset 304c may vary. In the embodiment shown, the first five slides are included; however, in other embodiments more or fewer slides could be included.

The metadata slides subset 304d generally provides an analogous set of slides to the slides subset 304c, but are rendered in a dynamic markup language (e.g., DHTML) or other markup language capable of being rendered within a web client. The purpose of the slides subset 304c and metadata slides subset 304d is to provide a first set of slides that can quickly be created from the presentation 304a and which can be quickly loaded at a client device (e.g., due to reduced size). While the presentation occurs using the slides subset 304c or metadata slides subset 304d, the full presentation can be processed in the background at the presentation host, such that by the time the presenter reaches slides after the slides subset, the entire presentation has been processed and is available to the remote devices of the attendees. The attendees and host therefore do not need to wait for the full presentation to be processed before beginning the presentation.

The metadata version of the presentation 304e includes a version of the presentation that can be loaded and displayed in a web client version of the collaboration software. In certain embodiments, the metadata version of the presentation 304e is a dynamic hypertext markup language (DHTML) version of the presentation; however, other markup language versions or versions capable of being rendered in a web client application could be created as well. Preferably, the metadata version of the presentation 304e and the metadata slides subset 304d are generated in the same markup language or other web-client compatible format.

The collaboration-compatible version of the presentation 304f represents a version of the presentation accessible via presentation application software, but which would correspond to a version of the software useable within the collaboration software. In embodiments where the native version of the presentation 302 is stored in a PPTX file format, the collaboration-compatible version of the presentation 304f could be a PPT file format.

The native version of the presentation 304g corresponds to copying the presentation 302 to the presentation server to allow native access of the presentation, and is useable by remote computing systems to view the presentation in the case where the remote systems can operate using collaboration software and the most recent presentation application software, and can be used by the presentation server to create additional resources as needed.

The image version of the presentation 304h includes a series of images representing still images of the slides, and can be used in the case where none of the other versions of the presentation can be loaded at a remote device for viewing. For example, a remote device may lack the collaboration software and would normally then use a web client for accessing the presentation, but may lack the computing capabilities or browser compatibility with the web client. In such cases, the user could view a series of slides as images natively within the web browser window to follow along with the presentation.

Although a particular set of resources are described in the present disclosure, it is noted that additional resources could be created as well, and the resources described herein could be created differently, for example utilizing different file formats, markup languages, image formats, sizes, numbers of slides, or other selected features.

Additionally, although in the embodiment shown the various resources are created at a presentation host, it is recognized that one or more of these resources could be generated at a presentation server or locally at one or more of the remote devices attempting to view the presentation. In such cases, the presentation 302 could be uploaded to a presentation server and resource creation could be managed at the presentation server or offloaded to one or more other computing devices.

Figure 5:
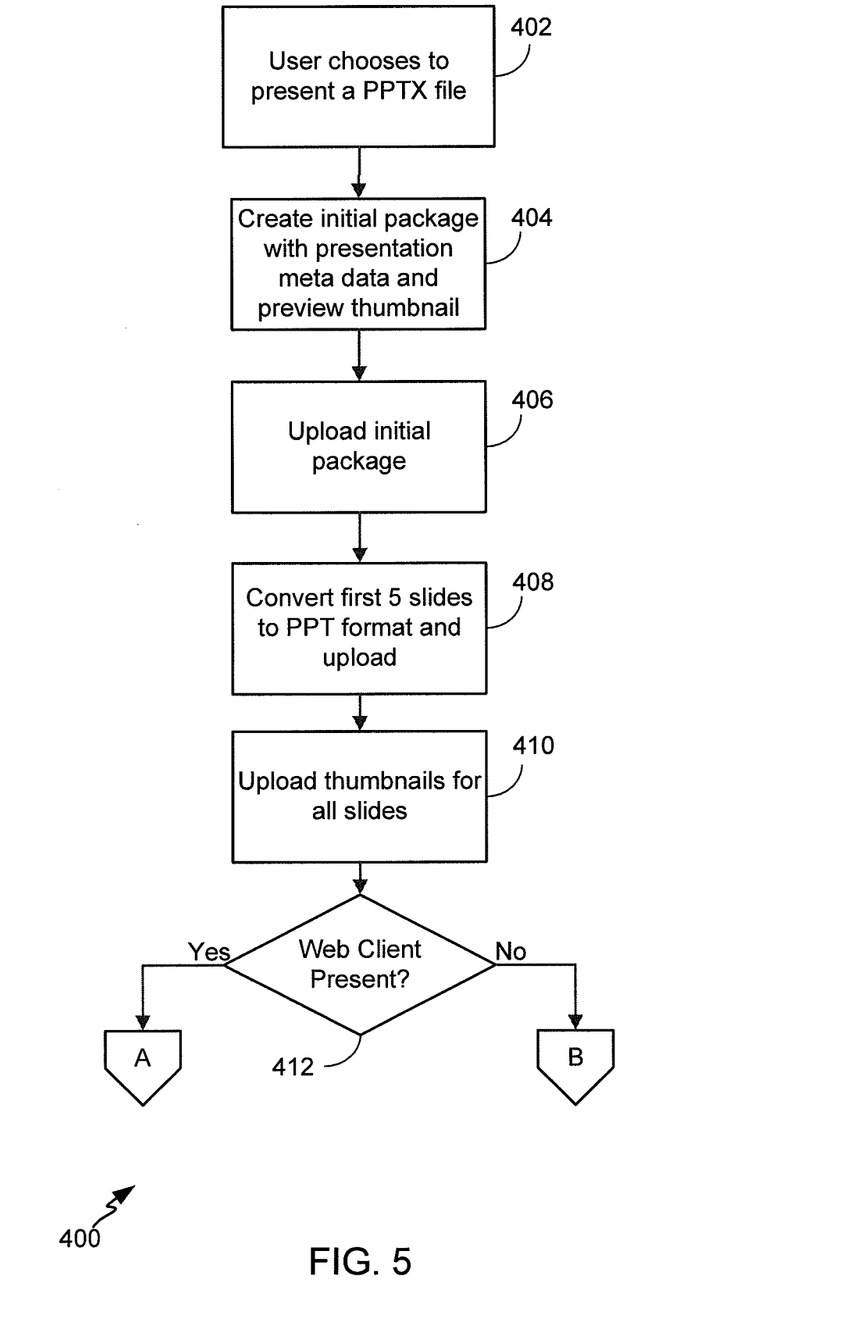
FIG. 5 is a flowchart of a method for processing of a presentation to reduce latency in a collaborative environment for providing a presentation to remote computing devices, according to a possible embodiment of the present disclosure.

FIG. 5 is a flowchart of a method 400 for processing of a presentation to reduce latency in a collaborative environment for providing a presentation to remote computing devices, according to a possible embodiment of the present disclosure. The method 400 can, for example, occur within an environment for displaying the presentation in a collaborative environment, such as shown in the example provided in FIG. 1, above. The method 400 begins upon user selection 402 of a presentation to be displayed to a number of remote system and users of those systems during a collaboration session in which a number of computers, including a presentation host and one or more remote systems, connect to a collaboration environment hosted by a presentation server. The selected presentation can be any of a number of types of presentations; in certain embodiments, the presentation is a PPTX formatted file generated by the POWERPOINT® presentation graphics program by Microsoft Corporation.

Following selection of the presentation, an initial package creation operation 404 causes creation of an initial package of data used to display a first view of the presentation to attendees of the presentation. The initial package of data can vary in different embodiments of the present disclosure. In the example illustrated in FIG. 5, presentation metadata and a preview thumbnail image are created. This initial package allows users to have knowledge of the presentation, e.g., by providing the information typically included with file properties in a file browser. Other information can be included in the initial package as well, such as described above with respect to resource 304*a-b*. An upload operation 406 uploads the initial package to a presentation server for access by remote systems (e.g., upload to presentation server 14 of FIG. 1).

Following the upload operation 406, a slide subset conversion operation 408 creates a set of slides including a first predetermined number of slides in a format useable within a collaboration software application. In the embodiment shown, the operation 408 creates a PPT file format presentation of the first five slides of the selected presentation to be displayed (e.g., resource 304*c* of FIG. 4); however, the specific number of slides and format of the file may vary in alternative embodiments. An upload operation 410 uploads the slide subset to the presentation server for access by remote systems.

A web client presence decision operation 412 determines whether a web client is present in the collaboration session (e.g., whether one of the remote systems is a web client). If a web client is present in the collaboration session, operational flow branches "yes" and proceeds to the method 420 illustrated in FIG. 6 (via off-page reference "A"). If no web client is present in the collaboration session, operational flow branches "no" and proceeds to the method 440 illustrated in FIG. 7 (via off-page reference "B").

Figure 6:
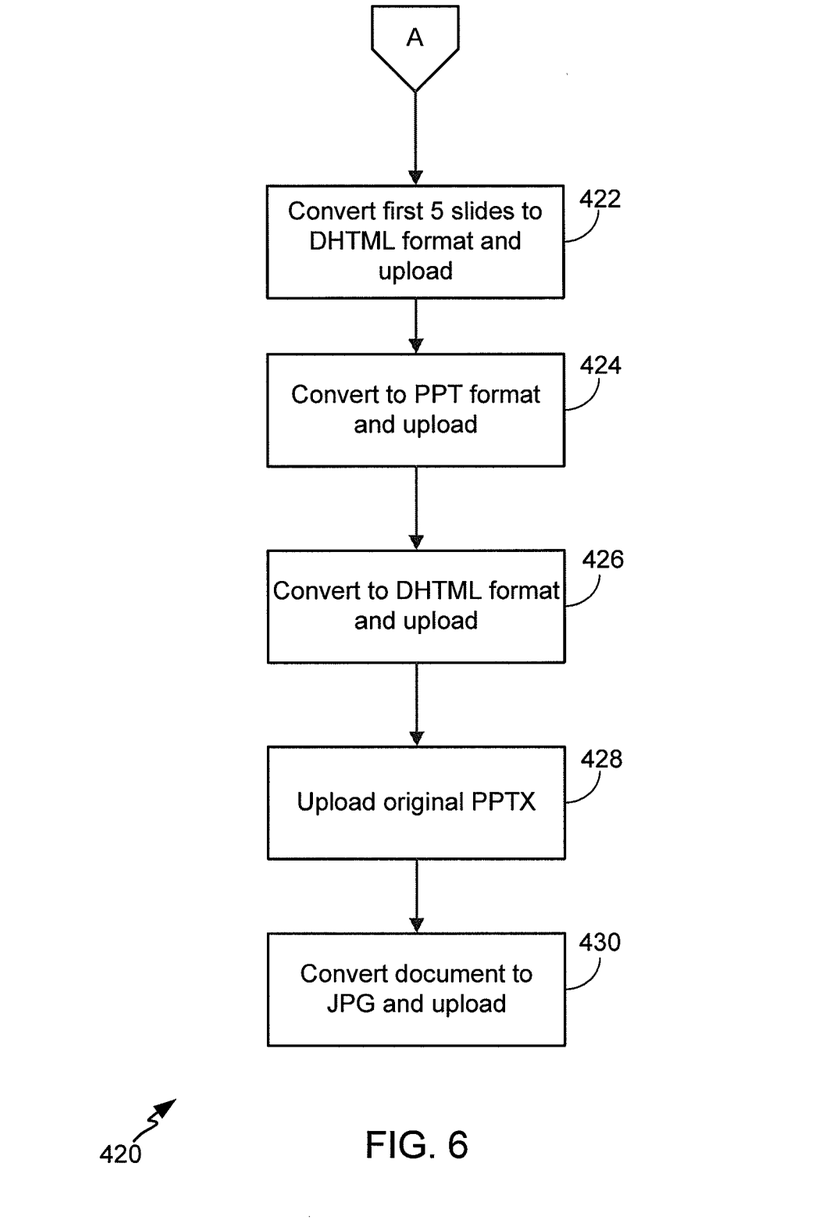
FIG. 6 is a flowchart for further processing of a presentation to reduce latency in a collaborative environment for providing a presentation to remote computing devices, useable with the method of FIG. 5.

FIG. 6 is a flowchart of a method 420 for further processing of a presentation to reduce latency in a collaborative environment for providing a presentation to remote computing devices, useable with the method 400 of FIG. 5. In the embodiment shown, the method 420 is initiated from off-page reference "A", indicating that the method 420 occurs upon a determination that a web client is present in a collaboration session, as determined by at least one of the presentation host or the presentation server.

A markup language subset conversion operation 422 creates a set of slides including a first predetermined number of slides in a format useable within a web client version of the collaboration software. The markup language subset conversion operation 422 therefore corresponds generally to the slide subset conversion operation 408, but creates a subset of the slides in a markup language version, rather than a native or collaboration-compatible version of the slides.

Following the markup language subset conversion operation 422, a native conversion operation 424 generates a native version of the presentation that can be used in the collaboration software and which is compatible with current and previous versions of the presentation software. In certain embodiments, the operation 424 generates a PPT format presentation from a PPTX format presentation. For example, the operation 424 can generate a resource such as collaboration-compatible version of the presentation 304*f* of FIG. 4, described above. In other embodiments where the current file format is widely accessible, the conversion may not be necessary, but instead would relate to upload and availability of an original native version of the file.

Following the native conversion operation 424, a markup language conversion operation 426 generates a markup language version of the presentation document. For example, the markup language conversion operation 426 can generate a dynamic markup language version of the full presentation, such as using DHTML or other markup language (as compared to operation 422, which only generates such a version of the first predetermined number of slides). The markup language conversion operation 426 therefore can form the resource 304*e* as illustrated in FIG. 4. Preferably, the markup language conversion operation 426 generates a markup language version in the same or a compatible format of presentation to the markup language subset conversion operation 422, described above. The markup language conversion operation 426 also uploads the markup language version of the presentation to the presentation server for use by web clients present in the collaboration session.

Following the markup language conversion operation 426, an upload operation 428 uploads a native version of the presentation (e.g., in PPT or PPTX format), or at least the remaining portion thereof, to the presentation server for access and upload, in case users of remote clients want to download an original version of the presentation, e.g., for editing or other purposes. The upload operation 428 can therefore generate and make available an additional resource, illustrated in FIG. 4 as resource 304*g*.

Following the upload operation 428, an image operation 430 generates a set of images representative of the slides in the presentation. The image operation 430 can generate any of a number of types of images; in some embodiments, the image operation 430 generates JPEG images for upload to the presentation server, corresponding to resource 304*h*.

As illustrated in FIG. 6, when at least one web client is present in a collaboration session, the methods 400, 420 illustrated herein prioritize generating resources that are loaded and viewed early in a presentation, e.g., items describing the presentation (presentation metadata), a representative slide, and thumbnails of the slides in that presentation. Additionally, the methods 400, 420 prioritize generating the first predetermined number of slides within a presentation in a number of formats (e.g., both native and markup language versions) over generating a full set of resources for any one type of client. It is noted, however, that according to the order of generation of resources, resources used by the collaboration software are prioritized over resources used by a web client, which are in turn prioritized over resources available as a "last resort", e.g., images illustrating the presentation for use when no software is available to view a collaborative version of the presentation.

Figure 7:
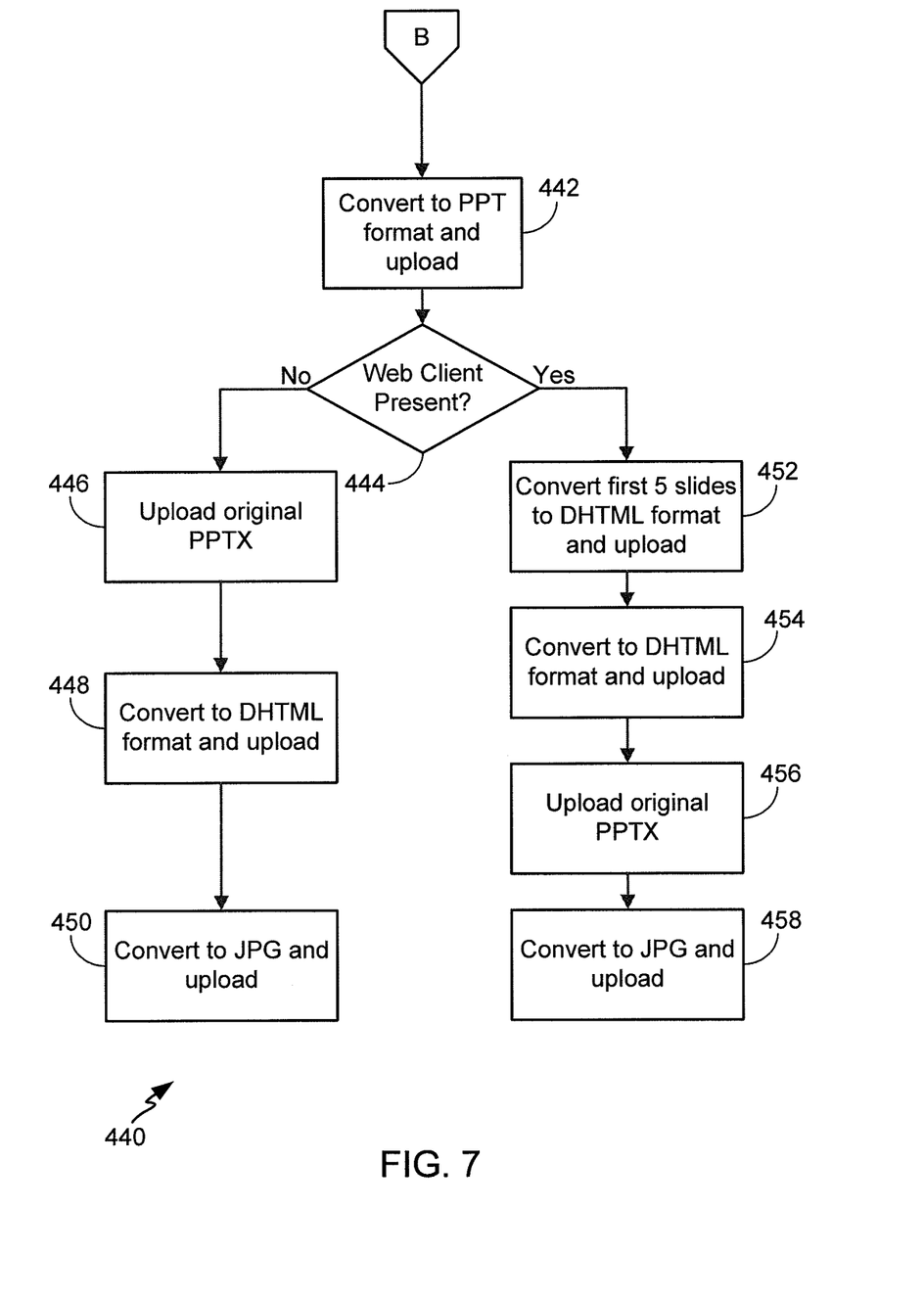
FIG. 7 is a flowchart for further processing of a presentation to reduce latency in a collaborative environment for providing a presentation to remote computing devices, useable with the method of FIGS. 5-6.

FIG. 7 is a flowchart for further processing of a presentation to reduce latency in a collaborative environment for providing a presentation to remote computing devices, useable with the method of FIGS. 5-6. In the embodiment shown, the method 440 is initiated from off-page reference "B", indicating that the method 440 occurs upon a determination that a web client is not present in a collaboration session, as determined by at least one of the presentation host or the presentation server.

Once it is determined that no web client is present, it can be assumed that creation of a full set of resources used for display of a native version can be prioritized over creating of a version useable in a web client. Therefore, following the web client presence decision operation 412 of FIG. 5, a native conversion operation 442 generates a native version of the presentation that can be used in the collaboration software and which is compatible with current and previous versions of the presentation software. In certain embodiments, the operation 442 generates a PPT format presentation from a PPTX format presentation. For example, the operation 442 can generate a resource such as collaboration-compatible version of the presentation 304f of FIG. 4, described above. In other embodiments where the current file format is widely accessible, the conversion may not be necessary, but instead would relate to upload and availability of an original native version of the file. Therefore, native conversion operation 442 is generally equivalent to operation 424 of FIG. 6, but happens earlier in the sequence due to lower emphasis on creating the markup language resources used with a web client.

Following the native conversion operation 442, a second web client presence decision operation 444 determines the presence of a web client using the collaboration software. If at this point a web client is not present, operational flow branches "no" and proceeds to an upload operation 446. The upload operation 446 generally corresponds to upload operation 428 of FIG. 6, in that it uploads a native version of the presentation (e.g., in PPT or PPTX format) to the presentation server for access and upload, in case users of remote clients want to download an original version of the presentation, e.g., for editing or other purposes. The upload operation 446 can therefore also generate and make available a resource for download by remote systems, for example the resource 304g illustrated in FIG. 4.

Following the upload operation, a markup language conversion operation 448 generates a markup language version of the presentation document. The operation 448 can correspond, for example, to operation 426 of FIG. 5, and can generate a dynamic markup language version of the full presentation, such as using DHTML or other markup language. The markup language conversion operation 448 therefore can form the resource 304e as illustrated in FIG. 4. The markup language conversion operation 448 also uploads the markup language version of the presentation to the presentation server for use by web clients if such web clients connect to the presentation server to access the resource either during or after the collaboration session.

In method 440, it is noted that there is no module fore creating a markup language version of only a subset of the presentation slides, since there are no web clients which would immediately require such resources, and those resources would become irrelevant once the full markup language version is created.

Following the markup language conversion operation 448, an image operation 450 generates and uploads a set of images (e.g., a resource 304h) representative of the slides in the presentation, analogously to image operation 430 of FIG. 6. At this point, a complete set of resources has been created, and the presentation can be viewed either within a collaboration application program (e.g., the native version), web client (markup language), or web browser (images).

If the second web client presence decision operation 444 determines that a web client is in fact present, operation flow branches "yes" and proceeds to a markup language subset conversion operation 452, which is analogous to operation 422 of FIG. 6.

Following the markup language subset conversion operation 452, markup language conversion operation 454 generates a full markup language version compatible with the version created during operation 452, as explained above with respect to operations 422-424 of FIG. 6.

Following the markup language conversion operation 454, an upload operation 456 generally corresponds to operation 428 of FIGS. 6 and 448 of FIG. 7. Following the upload operation, an image operation 458 generally corresponds to operation 450 of FIGS. 7 and 430 of FIG. 6, causing generation of image versions (e.g., JPEG or other image format) of the presentation slides for viewing by clients (e.g., remote systems) incapable of using either the collaboration software or web client. These image versions of the presentation slides can be provided to a remote system, for example upon receiving indication from a remote computing device of that system's failure to display another format of the presentation.

In comparing the different options provided in FIG. 7, it can be seen that where no web client is present, creation of native versions of the presentation is prioritized, and creation of a subset of markup language slides is not performed. Where a web client is determined present by the second web client presence decision operation 444, the overall process 440 corresponds to the process 420, except native conversion operation 442 occurs prior to both the markup language subset conversion operation 452 and markup language conversion operation 454, while in FIG. 6 the native conversion operation 424 occurs prior to markup language conversion operation 426.

Although a particular order of operations are described in connection with FIGS. 5-7, it is understood that a different order of operations could be performed as well. For example, depending upon the amount of time to upload a complete native version of the presentation, that complete native version upload might be completed before creating the first subset of markup language slides used by web clients. Other orders may be advisable as well, depending on delays and priorities determined by the presentation features.

Among other advantages, the generation of resources and making those resources available before all resources are generated allows for collaboration on presentations with lower latency between when a presentation host initiates display of the presentation and when each of the attendees can view the presentation, allowing each of the attendees to follow the presentation as it occurs.

The above specification, examples and data provide a complete description of the manufacture and use of the composition of the invention. Since many embodiments of the invention can be made without departing from the spirit and scope of the disclosure, the invention resides in the claims hereinafter appended.

The invention claimed is:

1. A method of delivering a presentation created using a presentation application program, the method comprising:
   receiving a request to view a presentation from a remote computing device, the presentation including a plurality of slides;
   receiving an initial set of more than one presentation slides for the presentation, the initial set of presentation slides including two or more separately viewable slides selected from the plurality of slides, wherein the initial set of presentation slides is received in at least two formats;
   determining which of the at least two formats is compatible with the remote computing device; and
   sending the initial set of presentation slides to the remote computing device in the compatible format;
   after sending the initial set of presentation slides, receiving a remainder of the plurality of slides;
   sending the remainder of the plurality of slides to the remote computing device in the compatible format.

2. The method of claim 1, further comprising:
   receiving a copy of the presentation from the presentation host; and
   storing presentation metadata of the presentation to render a display of presentation content based on a type of remote device accessing the presentation.

3. The method of claim 2, wherein the presentation metadata includes at least one of a presentation name, a number of presentation slides, an initial slide name, an initial slide number, or a note regarding one or more slides of the presentation.

4. The method of claim 1, wherein sending the initial set of presentation slides includes sending one or more slides of the initial set of presentation slides in at least one of a native format, a markup language format, or an image format.

5. The method of claim 1, further comprising:
   receiving a change to at least one slide of the presentation; and
   communicating the change to the remote device in the format presented to the remote device.

6. The method of claim 1, further comprising:
   sending a remainder of the presentation slides to the remote computing device in the compatible format.

7. The method of claim 1, further comprising:
   transferring control over the presentation from a presentation host to the remote device.

8. A method of delivering a presentation created using a presentation application program, the method comprising:
   receiving a request to view a presentation from one or more remote computing devices, the presentation including a plurality of slides;
   receiving an initial set of more than one presentation slides for the presentation, the initial set of presentation slides including two or more separately viewable slides selected from the plurality of slides;
   uploading the initial set of presentation slides to at least one of the one or more remote computing devices;
   after uploading the initial set of presentation slides, receiving a remainder of the presentation slides; and
   uploading the remainder of the presentation slides to at least one of the one or more remote computing devices.

9. The method of claim 8, further comprising:
   receiving the initial set of presentation slides is received in at least two formats; and
   determining which of the at least two formats is compatible with the one or more remote computing devices.

10. The method of claim 9, wherein sending the initial set of presentation slides includes sending one or more slides of the initial set of presentation slides in at least one of a native format, a markup language format, or an image format.

11. The method of claim 8, further comprising:
    receiving a copy of the presentation from the presentation host; and
    storing presentation metadata of the presentation to render a display of presentation content based on a type of remote device accessing the presentation.

12. The method of claim 11, wherein the presentation metadata includes at least one of a presentation name, a number of presentation slides, an initial slide name, an initial slide number, or a note regarding one or more slides of the presentation.

13. The method of claim 8, further comprising:
    receiving a change to at least one slide of the presentation; and
    communicating the changes to the remote device in the format presented to the remote device.

14. The method of claim 8, further comprising:
    sending a remainder of the presentation slides to the remote computing device in the compatible format.

15. The method of claim 8, further comprising:
    transferring control over the presentation from a presentation host to the remote device.

16. A presentation server including a memory operatively connected to a programmable circuit configured to execute program instructions, that, when executed cause the presentation server perform operations comprising:
    receiving a request to view a presentation from a remote computing device, the presentation including a plurality of slides;
    receiving an initial set of more than one presentation slides for the presentation, the initial set of presentation slides including two or more separately viewable slides selected from the plurality of slides, wherein the initial set of presentation slides is received in at least two formats;
    determining which of the at least two formats is compatible with the remote computing device;
    sending the initial set of presentation slides to the remote computing device in the compatible format;
    after sending the initial set of presentation slides, receiving a remainder of the presentation slides; and
    uploading the remainder of the presentation slides to the remote computing device in the compatible format.

17. The presentation server of claim 16, wherein the instructions further cause the presentation to perform operations comprising:
    receiving a copy of the presentation from the presentation host; and
    storing presentation metadata of the presentation to render a display of presentation content based on a type of remote device accessing the presentation.

18. The presentation server of claim 17, wherein the presentation metadata includes at least one of a presentation name, a number of presentation slides, an initial slide name, an initial slide number, or a note regarding one or more slides of the presentation.

19. The presentation server of claim 16, wherein sending the initial set of presentation slides includes sending one or more slides of the initial set of presentation slides in at least one of a native format, a markup language format, or an image format.

20. The presentation server of claim 16, wherein the instructions further cause the presentation to perform operations comprising:
   receiving a change to at least one slide of the presentation; and
   communicating the change to the remote device in the format presented to the remote device.

\* \* \* \* \*